(12) United States Patent
Irie (10) Patent No.: US 6,259,926 B1
(45) Date of Patent: Jul. 10, 2001

(54) ID TRANSFER METHOD FOR WIRELESS COMMUNICATION APPLIANCES

(75) Inventor: Kenji Irie, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/053,775

(22) Filed: Apr. 2, 1998

(30) Foreign Application Priority Data

Apr. 3, 1997 (JP) .................................................. 09-084802

(51) Int. Cl.⁷ ...................................................... H04B 7/26

(52) U.S. Cl. ............................. 455/509; 455/517; 455/88

(58) Field of Search .................................. 455/507, 509, 455/517, 462, 463, 464, 465, 550, 575, 62, 68, 88, 31.1, 38.1; 375/310, 311, 313, 327, 341

(56) References Cited

U.S. PATENT DOCUMENTS 5,212,809 * 5/1993 Oka ........................................ 455/88

* cited by examiner

*Primary Examiner*—Thanh Cong Le
(74) *Attorney, Agent, or Firm*—Jay H. Maioli (57) ABSTRACT

In an ID transfer method used in a wireless communication appliance system, a bit number of the ID used to avoid erroneous recognitions is increased. However, when the bit number of this ID is increased, the protocol time of a message is prolonged, resulting in a short battery lifetime, and radio interference problems. To avoid these problems, in an ID transfer method used in a wireless communication appliance system in which a wireless communication is established between wireless communication appliances having the same IDs, when data is transmitted/received by way of a message of a wireless form, a portion of the ID is overlapped with information of the message by executing an arithmetic operation, and then the message overlapped with the portion of the ID is transmitted.

9 Claims, 5 Drawing Sheets

ID TRANSFER METHOD FOR WIRELESS COMMUNICATION APPLIANCES

BACKGROUND OF THE INVENTION

The present invention is related to an ID (identification) transfer method for wireless communication appliances, used to establish a wireless communication between appliances having the same IDs.

Generally speaking, in an ID transfer method of wireless communication appliances where a wireless communication is established between wireless communication appliances having the same IDs, such an ID capable of recognizing these relevant wireless communication appliances is inserted into the protocol of a message used therein. In this case, the bit number of the ID must be increased so as to avoid erroneous recognitions. If the bit number of the ID is increased, then the message itself is extended, or prolonged. When the message is extended, the protocol time of this message is prolonged. As a result, the following problems will occur:

1) A battery lifetime is shortened in a battery-built-in type wireless appliance such as a cordless type telephone unit.
2) Time required to establish a wireless connection is prolonged.
3) Since a message itself is extended, there are many cases that this message receives radio interference noise.

Figure 1:
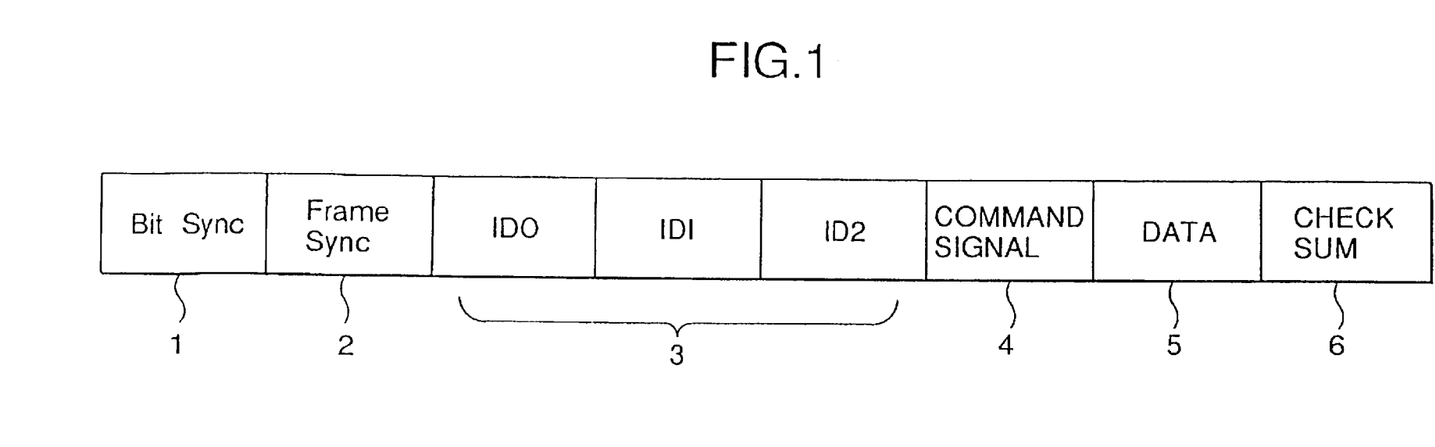
FIG. 1 schematically represents the format of the wireless message generally used in wireless appliances such as a cordless type telephone system.

FIG. 1 schematically shows the format of the wireless message presently used in various wireless appliances such as cordless type telephone units.

In FIG. 1, reference numerals 1, 2, 3 to 6 indicate the respective digits for constituting a wireless message, and each digit is constructed of 4 bits. That is, reference numeral 1 shows a bit sync (synchronization) signal (Bit Sync) constituted by a continuation of mark signals. The bit sync signal 1 is used for waiting purposes when a message is started to be transmitted, and when a message is started to be received. This bit sync signal 1 is added to a head of a message. Reference numeral 2 shows a frame sync signal (Frame Sync) constituted by fixed data in which a mark signal is mixed with a space signal. This frame sync signal 2 is used to indicate a head of data. Reference numeral 3 indicates an ID code constituted by 3-digit IDs "ID0" to "ID2". These ID codes "ID0", "ID1", and "ID2" correspond to code signals for pairing wireless appliances which communicate with each other, for example, a mother unit and a child unit in a cordless telephone system. Messages having different ID codes are neglected between wireless appliances.

Reference numeral 4 shows a command signal for indicating a content of a message to be executed. For example, as this command signal 4, the following commands are provided:

Ringing request/acknowledge command: Ring REQ/ACK,
Ringing command: Ring RUN,
Outer line request/acknowledge command: Outer line REQ/ACK,
Execution command for connecting outer line: Outer line RUN,
Dialing request/acknowledge command: Dial REQ/ACK,
Dialing execution command: Dial RUN.

Reference numeral 5 is data for indicating detailed contents of the command signal. For instance, in the case of the command "Dial REQ", a content of dialing is entered into the data. In the case of the command "Ring REQ", ON/OFF is entered into the data. Reference numeral 6 shows a check sum which is used to check an error that may have occurred in a receiver side. To this check sum, a total of lower 4 bits of the data 3, 4, 5 are entered.

Figure 2:
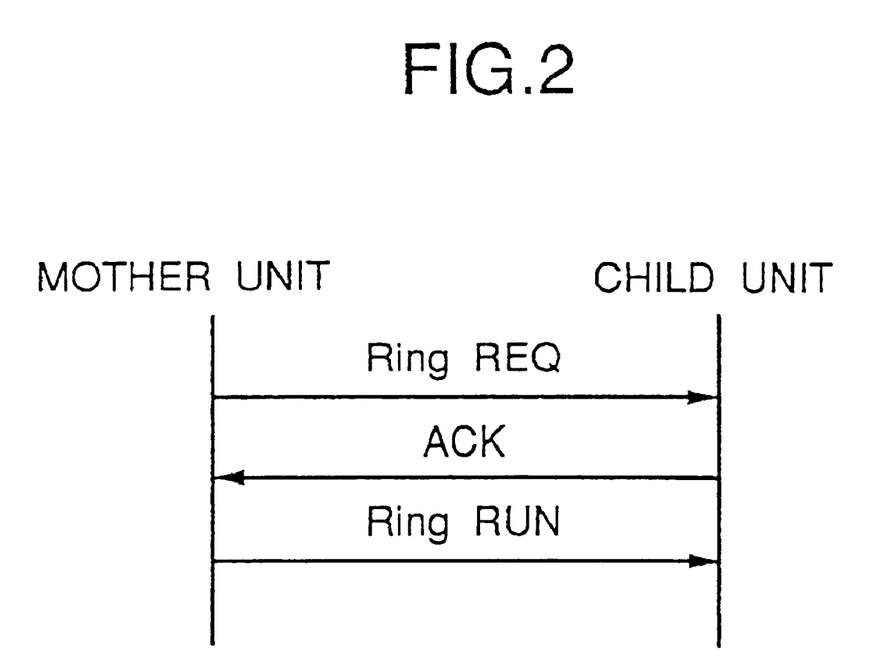
FIG. 2 schematically shows a sequential operation of message communications executed between a mother unit and a child unit in a cordless type telephone system.

FIG. 2 schematically illustrates a sequential operation when a message is executed. For instance, in order that a telephone call issued from an outer line is transferred to a child unit, it is required to ring this child. To this end, the command signal "Ring REQ" is first sent from a mother unit to the child unit. When this command signal is recognized by the child unit, the command signal "Ring ACK" is returned from the child unit to the mother unit. When the mother unit receives the command signal "Ring ACK" issued from the child, the mother unit sends the command signal "Ring RUN" to the child unit. When this command signal "Ring RUN" is received by the child unit, the message is executed.

In other words, after the message as shown in FIG. 1 has been sent/received one and a half return times, the message is executed. In this case, when the mother unit can not receive "ACK" issued from the child unit within a preselected time period after having sent out "REQ", this mother unit judges that the child unit does not receive "REQ". Also, when RUN is not returned from the mother unit within a preselected time period after the child unit has sent "ACK" to the mother unit, the child unit invalidates "REQ". As described above, in the case that the mother unit receives "ACK" and the child unit receives "RUN" between the mother unit and the child unit, both the mother/child units wait for such a message having a definite content.

Generally speaking, since the 10-bit ID is conventionally and widely used in wireless appliances such as cordless type telephone units, a 3-digit (1 digit=4 bits) ID code may be sufficiently provided. Very recently, IDs made of larger bit numbers than 10 bits, for instance, 16 bits are utilized, so that the 3-digit ID code represents shortage of the bit number.

To increase a bit number of an ID, a length of a message may be extended. However, when the length of the message is extended, protocol time of the message is prolonged. As a result, since a time period required to establish a wireless communication connection between relevant wireless appliances is prolonged, there are problems that a battery lifetime of such a wireless appliance as a battery-built-in type cordless telephone is shortened, and the wireless communication is susceptible to radio interference noise.

SUMMARY OF THE INVENTION

The present invention has been made to solve the above-described problems. To this end, in an ID transfer method of a wireless communication appliance according to the present invention, when data is transmitted/received by way of a wireless message, a portion of the IDs is overlapped with a command portion by way of an arithmetic operation, and then the ID-overlapped commands are transmitted to thereby shorten a length of a message.

In other words, in the wireless communication appliance for communicating with the appliances having the same IDs, when the data is transmitted/received in the form of the wireless message, a portion of the IDs is overlapped with the command portion by the arithmetic operation, which are sent out. Even when the bit number of the IDs is increased, the message itself is not extended, or prolonged, so that the above-described problems of the prior art can be solved.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

In summary, an ID (identification) transfer method in wireless appliances, according to an embodiment of the present invention, is featured by that at a transmitter side, the same message length as that of the conventional message format as shown in FIG. 1 is used, a 3-digit message format identical to the conventional 3-digit message format is used as an ID space, and a 2-digit ID of ID3 and ID4 are further added to a 3-digit ID of ID0, ID1, and ID2. To realize this feature, for instance, in the case of a REQ message, an exclusive-OR gating operation is performed between a command and the ID3 with respect to a command of the REQ message, and another exclusive-OR gating operation is performed between Data and the ID4 with respect to Data of the REQ message.

At a receiver side, when such a REQ message is received, both an ID3 and an ID4 of the ID are used with respect to the REQ message, and an exclusive-OR gating operation between Data and the ID4 is carried out with respect to the Data of the REQ message.

The commands and Data can be correctly reproduced by executing these operations.

Referring now to FIG. 1 and FIG. 2, a description will be made of such an embodiment in which the ID transfer method according to the present invention is applied to a cordless type mother/child telephone system.

Figure 3:
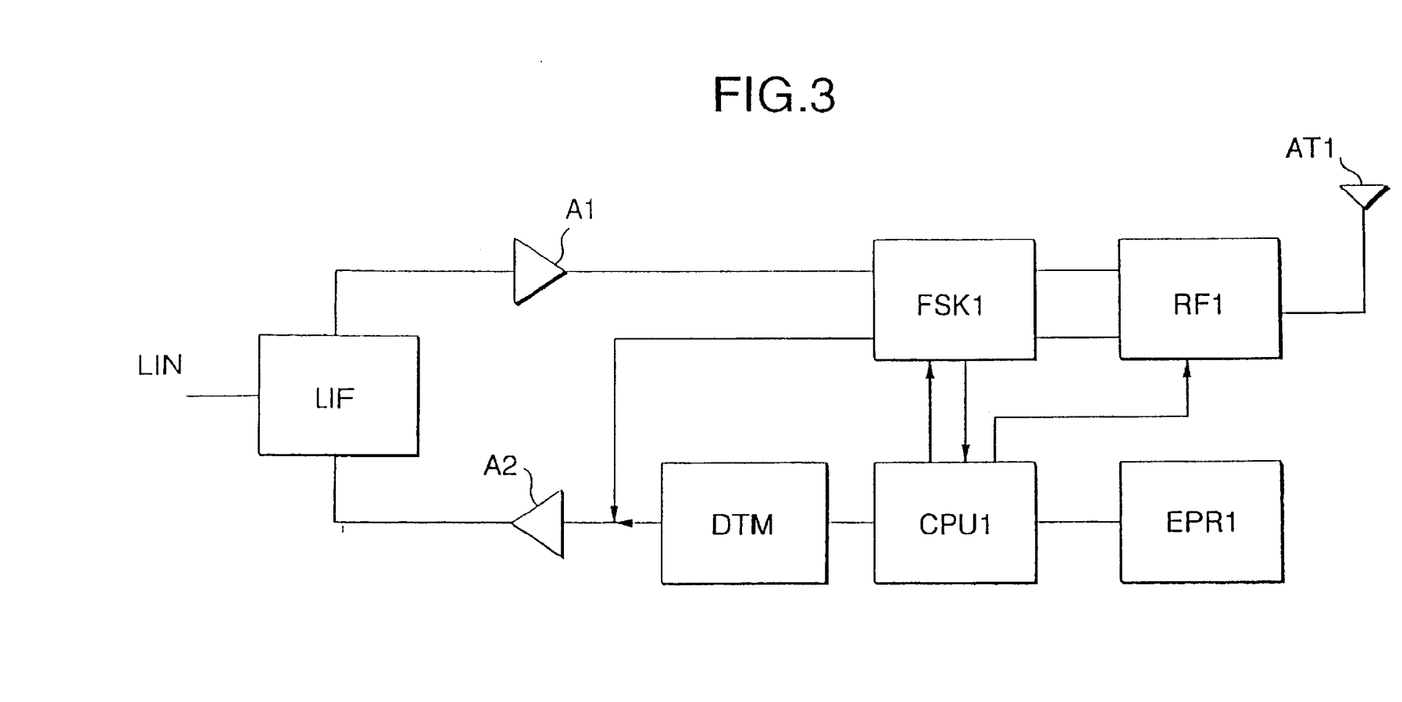
FIG. 3 is a schematic block diagram for representing an arrangement of a mother unit in a cordless type telephone system with using an ID transfer method according to an embodiment of the present invention.

FIG. 3 is a block diagram for showing an arrangement of a mother unit employed in a cordless type mother/child telephone system. In FIG. 3, symbol "LIN" indicates a telephone line. Symbol "LIF" shows a line interface of the mother unit, and this line interface LIF is used to connect this mother unit to the telephone line LIN. Also, symbols "A1" and "A2" denote amplifiers, and symbol "CPU1" shows a microprocessor for controlling various operations of the mother unit. Symbol "EPR1" represents a memory for storing data of the microprocessor CPU1 and also 5-digit ID numbers. Symbol "FSK1" is a modem for mutually converting a frequency signal used in a telephone line and a code signal used in the microprocessor and the like.

Also, in FIG. 3, symbol "IDTM" is an encoder for encoding a dialing signal constructed of a code signal outputted from the microprocessor CPU1 to produce another dialing signal used in the telephone line. Symbol "RF1" shows a radio frequency (high frequency) unit. This radio frequency unit RF1 converts the frequency signals and the data used in various sorts of telephone lines for establishing telephone communications between the mother unit and the child unit into wireless (radio) signals of radio frequencies. Conversely, this radio frequency unit RF1 converts the wireless signal received from the child unit into the frequency signal used in the telephone line. Symbol "AT1" is an antenna used to communicate with the child unit by wireless signals.

The line interface LIF is connected via the amplifier A1 to the modem FSK1, which constitute a telephone message receiving circuit. The modem FSK1 is connected to the radio frequency unit RF1, and this radio frequency unit RF1 is connected to the antenna AT1.

The modem FSK1 is connected via the amplifier A2 to the line interface LIF, which constitute a telephone message transmitting circuit. The microprocessor CPU1 exchanges various information among the modem FSK1, the radio frequency unit RF1, the encoder DTM, and the memory EPR1, and further controls these circuits.

The mother unit of the cordless type mother/child telephone system with employment of the above-described circuit arrangement is connected to the telephone line LIN by way of the line interface LIF, which is controlled by the microprocessor CPU1.

Figure 4:
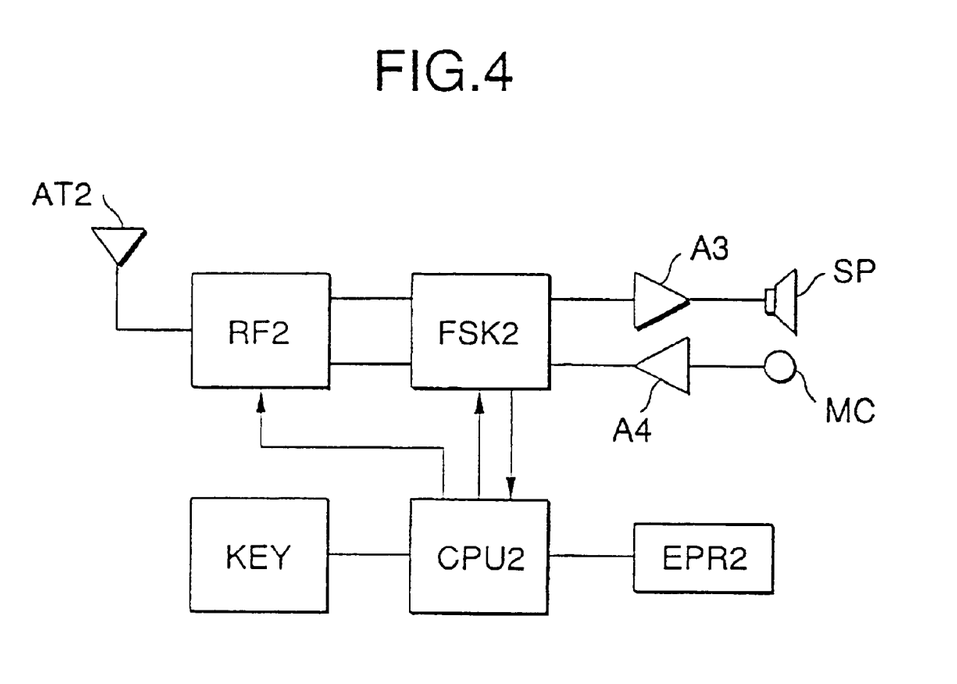
FIG. 4 is a schematic block diagram for indicating an arrangement of a child unit in the cordless type telephone system with using the ID transfer method according to the embodiment of the present invention.

FIG. 4 is a block diagram for indicating an arrangement of a child unit of the cordless type mother/child system. In FIG. 4, symbol "CPU2" indicates a microprocessor for executing various control operations of the mother unit. Symbol "EPR2" represents a memory for storing data of the microprocessor CPU2, and also a 5-digit ID number. Symbol "FSK2" denotes a modem for mutually converting a frequency signal used in the telephone line, and also a code signal used in the microprocessor CPU2 and the like. Symbol "RF2" shows a radio frequency (high frequency) unit. This radio frequency unit RF2 converts the frequency signals and the data used in various sorts of telephone lines for establishing telephone communications between the mother unit and the child unit into wireless (radio) signals of radio frequencies. Conversely, this radio frequency unit RF2 converts the wireless signal received from the child unit into the frequency signal used in the telephone line.

Symbol "AT2" indicates an antenna used to communicate with the child unit by wireless signals. Symbol "KEY" denotes a keyboard used to enter a telephone number and to set various operations. Symbols "A3" and "A4" denote amplifiers. Symbol "SP" indicates a speaker for the telephone message receiving unit, and symbol "MC" shows a microphone for the telephone message transmitting unit.

The radio frequency unit RF2 is connected to the antenna AT2. The modem FSK2 is connected via the amplifier A3 to the speaker SP. The microphone MC is connected via the amplifier A4 to the modem FSK2. The microprocessor CPU2 exchanges various information among the modem FSK2, the keyboard KEY, the radio frequency unit RF2, and the memory FPR2, and further controls these circuits.

Next, telephone communication operations established between the mother unit and the child unit in the cordless type mother/child telephone system will now be described with reference to FIG. 3 and FIG. 4.

There are two different sorts of telephone communication operations established between the mother unit and -the child unit in the cordless type mother/child telephone system:

1) In a case that the child unit receives a telephone call issued to the mother unit.

2) In a case that the child unit issues a telephone call via the mother unit to an outside line.

Since telephone calling requests may be made at any time between the mother unit and the child unit in the cordless type mother/child telephone system, the respective radio frequency units of the mother unit and child units should be continuously set to ON states.

In the cordless type mother/child telephone system shown in FIG. 3 and FIG. 4, when no telephone communication is established, the radio frequency units RF1 and RF2 employed in the mother unit and the child unit are controlled by the respective microprocessors CPU1 and CPU2 in such a manner that these radio frequency units RF1 and RF2 are once brought into the ON states only for 50 msec (milliseconds) per 2 seconds in order to save power consumption.

A first description is made of the above-described case 1) such that the child unit receives a telephone call issued to the mother unit. In the case that the child unit receives the telephone call issued from the outside line to the mother unit, when the mother unit receives this telephone call of the outside line, this mother unit is required to notify this telephone call to the child unit and also to set the telephone-call receivable condition of the child unit. To this end, the mother unit transmits a message "Ring REQ" of a command signal to the child unit, and this command signal commands a ringing operation of the child unit.

In this case, in order to write the ID number into this message, the microprocessor CPU1 of the mother unit writes the upper 3-digit "IDO" to "ID2" among the 5-digit ID codes saved in the memory EPR1 into the normal positions of the 3-digit ID codes of the message format shown in FIG. 3. Next, the microprocessor CPU1 executes an exclusive-OR gating operation between the 4th-digit ID code, namely "ID3" and the command signal, and then writes the result of this exclusiveOR gating operation into the digit of the command. Furthermore, the microprocessor CPU1 executes another exclusive-OR gating operation between the 5th-digit ID code, namely "ID4" and the Data signal, and then writes the result of this exclusive-OR gating operation into the digit of the Data.

Thus, the message into which the 5-digit ID codes have been written is converted by the modem FSK 1 into a frequency signal used in the telephone line, and then this frequency signal is supplied to the radio frequency unit RF1. The radio frequency unit RF1 converts this message into a radio-frequency wireless signal used to establish a telephone communication between the mother unit and the child unit. Then, the radio frequency unit RF1 transmits this radio-frequency wireless signal through the antenna AT1.

When the message of "Ring REQ", namely the command signal is transmitted from the mother unit, all of such child units located within the message receivable range may receive this message to check as to whether or not this transmitted message is issued to its own units. In this case, all of these child units firstly check as to whether or not the 3-digit ID codes "ID0" to "ID2" written into the normal ID-code digits are made coincident with the own ID codes.

The child unit, the ID code of which is not made coincident with the 3-digit ID codes "ID0" to "ID2", judges that this message is not issued to its, and therefore does not execute the subsequent operations.

To the contrary, the child unit, the own ID code of which is made coincident with the 3-digit ID codes "IDO" to "ID2", judges that this message is issued to its, and therefore the microprocessor CPU2 of this child unit executes the exclusive-OR gating operation between the received command signal and the 4th-digit ID code ID3 saved in the memory EPR2 to thereby reproduce the command signal. Furthermore, the microprocessor CPU 2 executes the exclusive-OR gating operation between the received Data signal and the 5th-digit ID code ID4 to thereby reproduce the Data signal.

Figure 5:
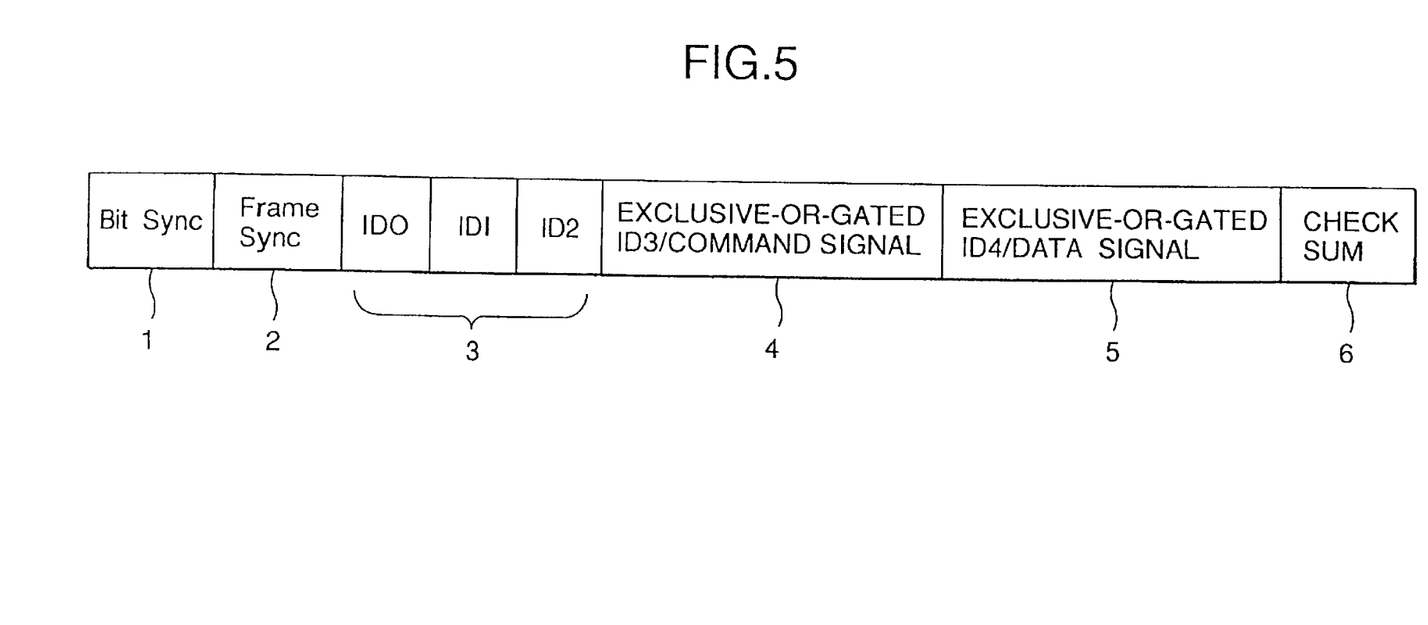
FIG. 5 schematically illustrates a format of a wireless message employed in the ID transfer method according to the embodiment of the present invention.

In this case, all of the child units having the ID codes which are different from the 4th-digit ID code ID3 and the 5th-digit ID4 of the ID codes designated by the mother unit execute the above-described exclusive-OR gating operations. However, both the command signal and the Data signal, which are reproduced based on these different ID codes ID3 and ID4, are reproduced as such messages different from the message transmitted from the mother unit. FIG. 5 shows a format of wireless message employed in the ID transfer method. Only in such a child unit having the 5-digit ID codes ID0 to ID4 all of which are correctly designated by the mother unit, both the command signal and the Data signal of the correct message transmitted from the mother unit may be reproduced.

Next, the child unit which has received the above-described message will transmit an ACK message as a response to the mother unit.

Also, in this case, in order to write the ID number into this message, the microprocessor CPU2 of the child unit writes the upper 3-digit "IDO" to "ID2" among the 5-digit ID codes saved in the memory EPR2 into the normal positions of the 3-digit ID codes of the message format shown in FIG. 1. Next, the microprocessor CPU2 executes an exclusive-OR gating operation between the 4th-digit ID code, namely "ID3" and the command signal, and then writes the result of this exclusive-OR gating operation into the digit of the command. Furthermore, the microprocessor CPU2 executes another exclusive-OR gating operation between the 5th-digit ID code, namely "ID4" and the Data signal, and then writes the result of this exclusive-OR gating operation into the digit of the Data.

Thus, the message into which the 5-digit ID codes have been written is converted by the modem FSK 2 of the child unit into a frequency signal used in the telephone line, and then this frequency signal is supplied to the radio frequency unit RF2. The radio frequency unit RF2 converts this message into a radio-frequency wireless signal. Then, the radio frequency unit RF2 transmits this radio-frequency wireless signal through the antenna AT2.

Also in this case, since the ACK messages transmitted from the child units having the above-explained different ID codes ID3 and ID4 are not made coincident with the content of the message sent out from the mother unit, the mother unit neglects these messages and continues the ACK message waiting condition. In the case that the correct ACK message is not received, this waiting operation of the mother unit is call time out.

As a result, since a RUN message is not sent from the mother unit to the child units which have transmitted these ACK messages, these child units similarly are brought into the time out condition. As a result, this may guarantee that the message protocol is not established between the mother unit and the child units having the different ID codes ID3 and ID4. The ACK message transmitted from the child unit having the correct ID codes ID3 and ID4 may constitute a message of a command signal "Ring REQ" in order to respond to the telephone ringing command.

When the mother unit receives such a message, the mother unit sends to the child unit a message of a command signal "Ring RUN" into which the 5-digit ID codes have been written and which rings this child unit in a similar manner to the above-operation. As a consequence, protocol of a ringing message can be established between the mother unit and the child unit designated by the mother unit, and thereafter a telephone communication is commenced.

The above description has been an example of the message protocol such that the mother unit rings the child unit designated by this mother unit. The operation for writing the ID codes into the above-described message may be completely similarly applied to messages of any other command signals.

For instance, in such a case that one child unit issues a telephone call via the mother unit to the outside line, this child unit produces such a message and then transmits this message to the mother unit. This message is a message of dialing request command signal, into which the 5-digit ID codes have been written in a similar manner.

As previously described in detail, the present inventive idea has been applied to the cordless type mother/child telephone system. However, the present invention is not limited to the cordless type mother/child telephone system, but may be similarly applied to various sorts of wireless communication appliances in which appliances having IDs communicate with each other.

As apparent from the above-described descriptions, in accordance with the ID transfer method in the wireless communication appliances, according to the present invention, in the wireless communication appliance for communicating with the appliance having the same IDs, when the data is transmitted/received by way of the wireless message, a portion of the IDs is overlapped with the command portion by the arithmetic operation, which are sent out. Even when the bit number of the IDs is increased, the message itself is not extended, or prolonged.

As a consequence, in accordance with the present invention, even when the total bit number of the IDs is increased so as to avoid the erroneous recognition, since the message itself is not extended, the below-mentioned effects can be achieved:

1) A battery lifetime is prolonged in a battery-built-in type wireless appliance such as a cordless type telephone unit.
2) Time required to establish a wireless connection is not prolonged.
3) Since a message itself is not extended, there are very few cases that this message receives radio interference noise.

What is claimed is:

1. An Identification (ID) transfer method used in a wireless communication appliance system in which a wireless communication is established using a wireless message of fixed length between wireless communication appliances having the same IDs, wherein the wireless message includes a plurality of ID digits, a command digit, and a data digit, the method comprising the steps of:

when data is transmitted/received by way of the wireless message of fixed length, overlapping at least one of said plurality of ID digits with at least said command digit of said wireless message by executing an arithmetic operation, and then transmitting said wireless message with said at least one ID digit and at least said command digit being overlapped.

2. An identification (ID) transfer method used in a wireless communication appliance system in which a wireless communication is established using a wireless message of fixed length between wireless communication appliances having the same IDs, wherein the wireless message includes a plurality of ID digits, a command digit, and a data digit, the method comprising the steps of:

when data is transmitted/received by way of the wireless message of fixed length, overlapping at least one of said plurality of ID digits with at least said command digit of said wireless message by executing an exclusive-OR gating operation, and then transmitting said wireless message with said at least one ID digit and at least said command digit being overlapped.

3. An identification (ID) transfer method used in a wireless communication is established using a wireless message of fixed length between wireless communication appliances having the same IDs, wherein the wireless message includes a plurality of ID digits, a command digit, and a data digit, the method comprising the steps of:

when data is transmitted/received by way of the wireless message of fixed length, receiving a message formed by superimposing one of the plurality of ID digits on said command digit and superimposing another of said plurality of ID digits on said data digit of said wireless message by executing an arithmetic operation, and arithmetically calculating the command digit and the data digit superimposed with the ID digits to thereby reproduce command information.

4. An identification (ID) transfer method used in a wireless communication appliance system in which a wireless communication is established using a wireless mesage of fixed length between wireless communication appliances having the same IDs, wherein the wireless message includes a plurality of ID digits, a command digit, and a data digit, the method comprising the steps of:

when data is transmitted/received by way of the message of fixed length, receiving a message formed by superimposing one of the plurality of ID digits on said command digit and superimposing another of said plurality of ID digits on said data digit information of said wireless message by executing an exclusive-OR gating operation, and arithmetically calculating the command digit and the data digit superimposed with the ID digits by an exclusive-OR gating operation to thereby reproduce command information.

5. An identification (ID) transfer method used in a wireless communication appliance system in which a wireless communication is established between wireless communication appliances having the same IDs, comprising the steps of:

when data is transmitted/received by way of a message of a wireless form, receiving a message formed by superimposing a portion of the ID on information of said message by executing an arithmetic operation, judging whether a portion of the ID of said received message which is not arithmetically calculated is made coincident with a portion of the own ID corresponding thereto; and when said portion of the ID of the received message is not made coincident with said portion of the own ID, stopping the wireless communication.

6. An identification (ID) transfer method used in a wireless communication appliance system in which a wireless communication is established between wireless communication appliances having the same IDs, comprising the steps of:

when data is transmitted/received by way of a message of a wireless form, receiving a message formed by superimposing a portion of the ID on information of said message by executing an arithmetic operation, judging whether a portion of the ID of said received message which is not arithmetically calculated is made coincident with a portion of the own ID corisonding thereto; and when said portion of the ID of said received message is made coincident with said portion of the own ID, arithmetically calculating the information superimposed with the ID to reproduce the information.

7. An identification (ID) transfer method used in a wireless communiation appliance system in which a wireless communication is established between wireless communication appliances having the same IDs, comprising the steps of:

when data is transmitted/received by way of a message of a wireless form, receving a message formed by superimposing a portion of the ID on information of said message by executing an exclusive-OR gating operation, judging whether a portion of the ID of said received message which is not arithmetically calculated is made coincident with a portion of the own ID corresponding thereto; and when said portion of the ID of said received message is made coincident with said portion of the own ID, arithmetically calculating the information superimposed with the ID by an exclusive-OR gating operation to reproduce the information.

8. An identification (ID) transfer method used in a wireless communication appliance system in which a wireless communication is established between wireless communication appliances having the same IDs, comprising the steps of:

when data is transmitted/received by way of a message of a wireless form, overlapping a portion of the ID with information of the message by executing an arithmetic calculation to thereby send the message information overlapped with said portion of the ID; and while information of a response message returned in response to said sent message information is arithmetically calculated to thereby reproduce the information, judging whether the IDs of superimposed portions are made coincident with each other by confirming that said reproduced information is made coincident with the information obtained before the arithmetic operation is carried out.

9. An identification (ID) transfer method used in a wireless communication appliance system in which a wireless communication is established between wireless communication appliances having the same IDs, comprising the steps of:

when data is transmitted/received by way of a message of a wireless form, overlapping a portion of the ID with information of the message by executing an exclusive-OR gating calculation to thereby send the message information overlapped with said portion of the ID; and while information of a response message returned in response to said sent message information is arithmetically calculated by an exclusive-OR gating operation to thereby reproduce the information, judging whether the IDs of superimposed portions are made coincident with each other by confirming that said reproduced information is made coincident with the information obtained before the arithmetic operation is carried out.

* * * * *